June 29, 1926.
K. RUMRICH
1,591,002
EXHAUST MOTOR
Filed Sept. 10, 1924
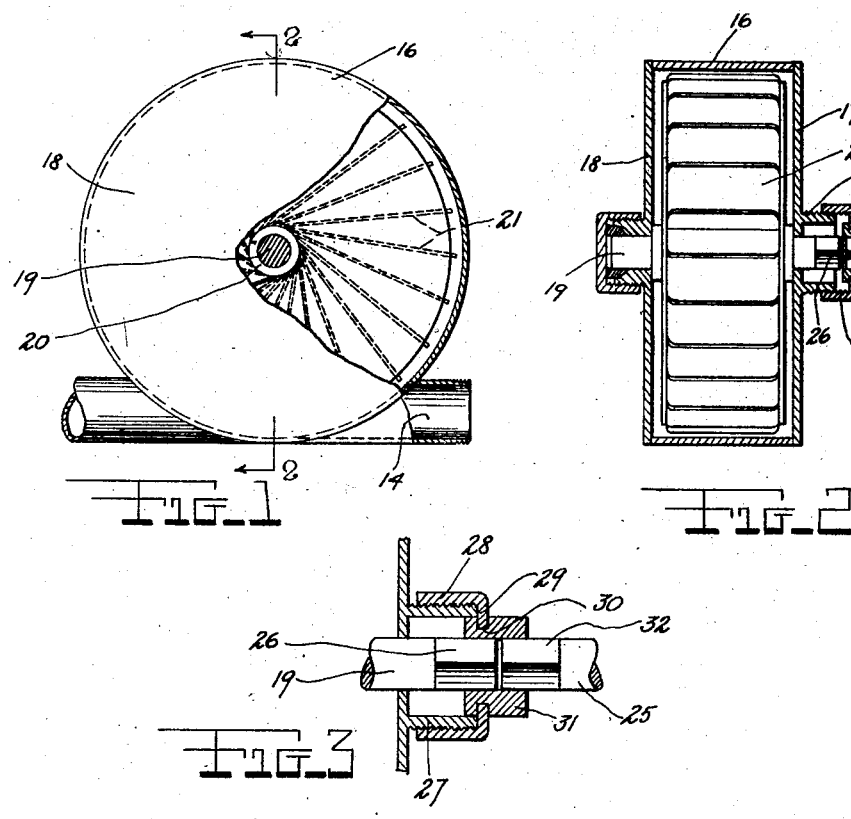
INVENTOR
*K. Rumrich*
BY
ATTORNEY Patented June 29, 1926.

UNITED STATES PATENT OFFICE.

KARL RUMRICH, OF NEW YORK, N. Y.

EXHAUST MOTOR.

Application filed September 10, 1924. Serial No. 736,851.

The main object of this invention is to provide a releasable coupling unit between the adjacent ends of the shaft of the motor and generator, said coupling unit being manually operated for the purpose of locking the generator shaft to the corresponding member of the motor or detaching one from the other as desired in a quick and ready manner.

These and other objects will become apparent in the description below, in which characters of reference refer to like-named parts in the drawing.

Referring briefly to the drawing,

Figure 1 is a partially sectioned elevational view of the motor.

Figure 2 is a longitudinal sectional elevational view of the motor taken on line 4—4 of Figure 3.

Figure 3 is a longitudinal sectional elevational view of the coupling unit, showing the generator and motor shafts in mutually locked position.

Referring in detail to the drawing, the numeral 14 indicates a funnel. The tubular member enters into a cylindrical casing 16 which is completely enclosed on its sides by face plates 17 and 18. The face plate 18 has a hub thereon in which one end of a shaft 19 is journalled, said shaft passing axially thru the casing and extending beyond the surface of the face plate 17. The shaft 19 has a collar 20 rigidly secured thereon and a plurality of blades 21 extend tangentially from said collar. The axis of the shaft 25 of an electric generator is aligned with the axis of the shaft 19 of the motor unit and the mutually adjacent sides of the aforementioned shafts are provided with square ends. The square end 26 of the shaft 19 is housed within the threaded sleeve-like member 27 which projects from and is integral with the face plate 17. The threaded sleeve is engaged by a collar 28 which is provided with a side flange 29, the edge of the latter being rotatable or movable in a channel 30 formed in a locking block 31 which is provided with a square opening, the latter being adapted to slip over the square end 32 of the generator shaft and the square end 26 of the motor shaft 19 and lock both shafts so that rotation in unison of the motor shaft and generator shaft is possible.

The motor shaft when coupled to the shaft 25 of the generator will cause the latter to rotate and store energy in a storage battery. When it is not desired that the generator shaft 25 be rotated, the collar 28 is rotated in the proper direction on the sleeve 27 until the block 31 is entirely seated upon the square end 32 of the generator shaft 25. In this position it will be noted that the motor shaft 19 is free to turn independently while the generator remains in a position of rest. In coupling the shafts 19 and 25, a collar 28 is rotated in the required direction until the block 31 arrives at the position shown in Figure 3 in which said block is supported on both shafts, and thus locks the same so that they rotate in unison.

I claim:—

In an exhaust motor, a coupling for joining or disjoining shafts placed end to end, said shafts having square ends, a threaded sleeve on the motor, a block having a square opening passing therethru and an annular encircling channel, said block being mounted on said square shafts and being slidable into the threaded sleeve, said threaded sleeve being fixed, a collar threaded on the sleeve and having a flange engageable in the encircling channel of said block, said flange being free to rotate relative to the block, said collar on being threaded upon the sleeve being capable of sliding said block along the square portion of one shaft onto the squared portion of the other shaft to couple the two shafts.

In testimony whereof I affix my signature.

KARL RUMRICH.